United States Patent [19]

Klubitschko et al.

[11] Patent Number: 5,671,942
[45] Date of Patent: Sep. 30, 1997

[54] FRONT JAW FOR A SKI BINDING

[75] Inventors: Gerd Klubitschko, Oberammergau; Premek Stepanek, Garmisch-Partenkirchen, both of Germany

[73] Assignee: Marker Deutschland GmbH, Germany

[21] Appl. No.: 392,528

[22] Filed: Feb. 23, 1995

[30] Foreign Application Priority Data

Feb. 23, 1994 [DE] Germany ............ 44 05 875.6
Feb. 23, 1994 [DE] Germany ............ 94 03 019 U

[51] Int. Cl.$^6$ ............................ A63C 9/08
[52] U.S. Cl. ............ 280/634; 280/626; 411/402
[58] Field of Search .................. 411/402, 409; 280/632, 633, 634, 625, 626, 629

[56] References Cited

U.S. PATENT DOCUMENTS

| | | | |
|---|---|---|---|
| 968,783 | 8/1910 | Moore | 411/409 |
| 2,103,944 | 12/1937 | Gullborg | 411/402 X |
| 3,866,930 | 2/1975 | Salomon | 280/11.35 T |
| 4,758,017 | 7/1988 | Stritzl et al. | 280/634 X |
| 4,765,641 | 8/1988 | Peyre | 280/634 X |
| 4,889,359 | 12/1989 | Kowatsch et al. | 280/634 X |
| 4,902,031 | 2/1990 | Bogner | 280/634 X |

FOREIGN PATENT DOCUMENTS

| | | | |
|---|---|---|---|
| 366 156 | 3/1982 | Austria. | |
| 390 382 B | 4/1990 | Austria. | |
| 0 303 026 B1 | 10/1992 | European Pat. Off. . | |
| 0 564 769A1 | 10/1993 | European Pat. Off. | A63C 9/085 |
| 2328956 | 5/1977 | France. | |
| 2 492 668 | 4/1982 | France | A63C 9/00 |
| 2 537 878 | 6/1984 | France | A63C 11/00 |
| 2492668 | 9/1984 | France. | |
| 30 04 529 | 4/1980 | Germany. | |
| 33 44 623 A1 | 6/1984 | Germany. | |
| 37 09 513 A1 | 10/1988 | Germany. | |
| 39 03 852 A1 | 9/1989 | Germany. | |
| 31 47 541 C2 | 7/1990 | Germany. | |
| 39 18 938 A1 | 12/1990 | Germany. | |
| 39 18 938 | 12/1990 | Germany | A63C 9/085 |
| 607299 | 8/1948 | United Kingdom. | |
| 2 188 390 | 9/1981 | United Kingdom. | |
| PCT/EP92/ 00655 | 3/1992 | WIPO. | |

Primary Examiner—Brian L. Johnson
Assistant Examiner—Michael Mar
Attorney, Agent, or Firm—D. Peter Hochberg; Mark Kusner

[57] ABSTRACT

A front jaw of a ski binding having a housing arranged on a base plate adapted to be mounted fixedly on a ski, at least one sole holder, which is held in a no load position thereof by means of a spring-loaded tension applying device subject to the action of a spring. The spring force acting on the tension applying device is adjustable by rotation of the head of a screw. One end of the spring bears against the housing and the other end thereof bears against a screw head of the tension applying device. The screw head of the tension applying device is designed in the form of a coupling screw. A cap engageable with the screw head is arranged in the removable housing part such that it may be turned from outside the removable housing part. The invention also relates to a method for assembling the above-mentioned front jaw.

8 Claims, 6 Drawing Sheets

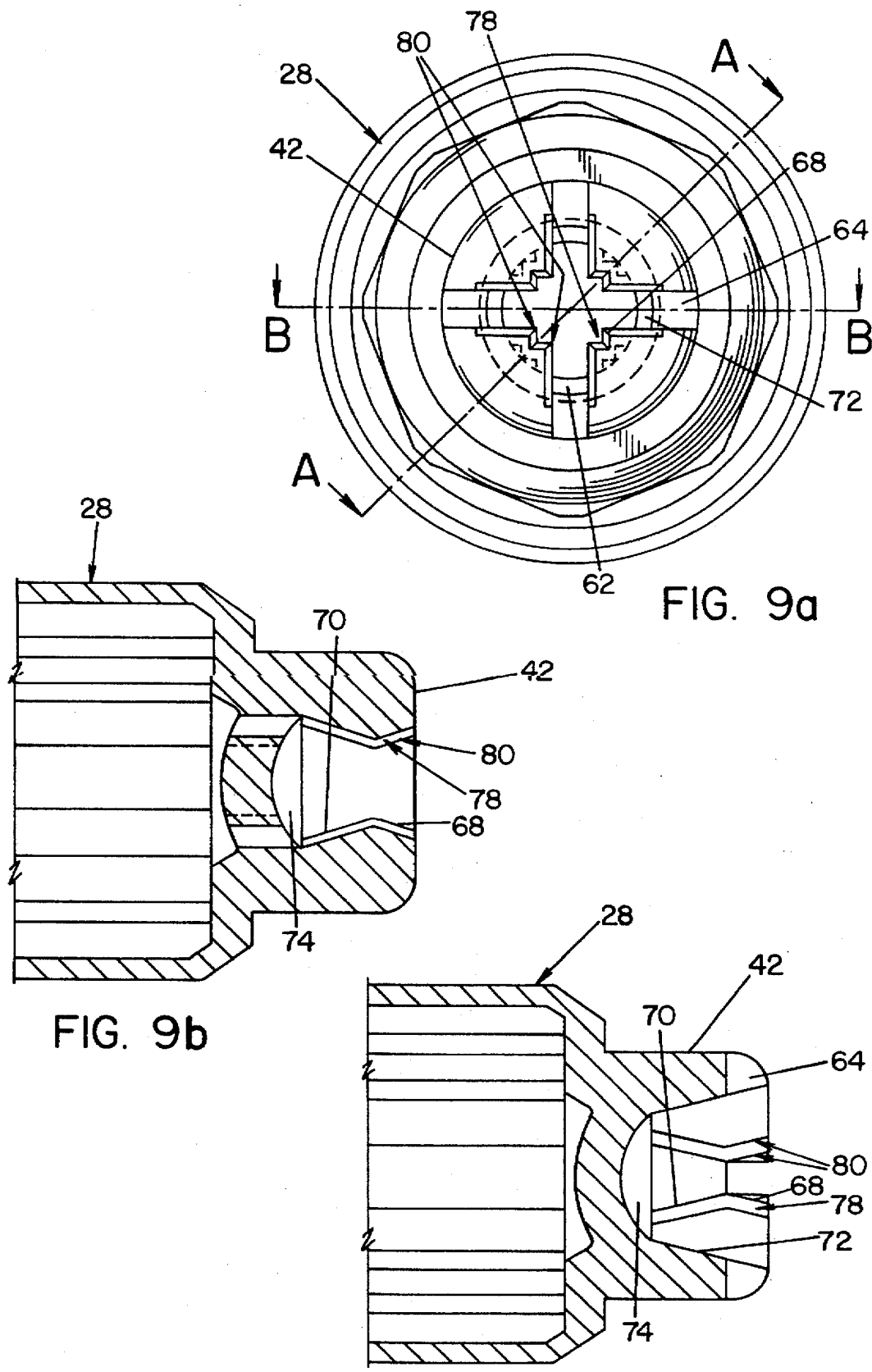

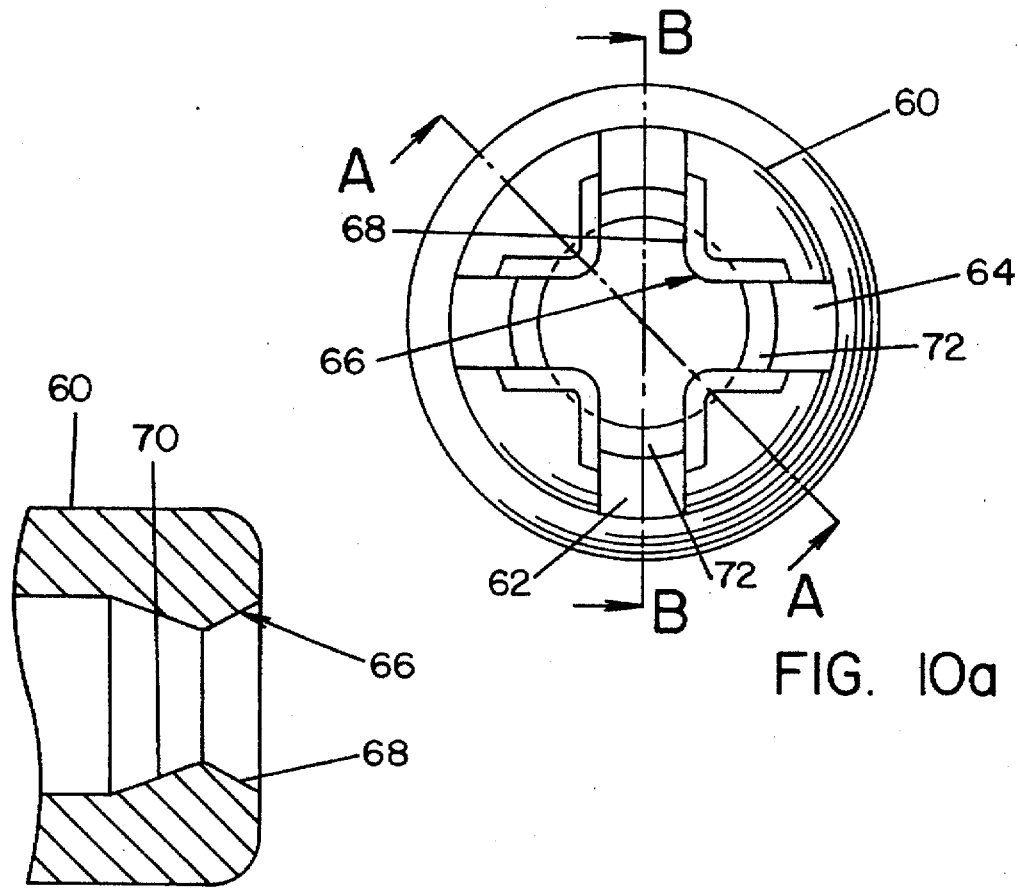
FIG. 10a
FIG. 10b
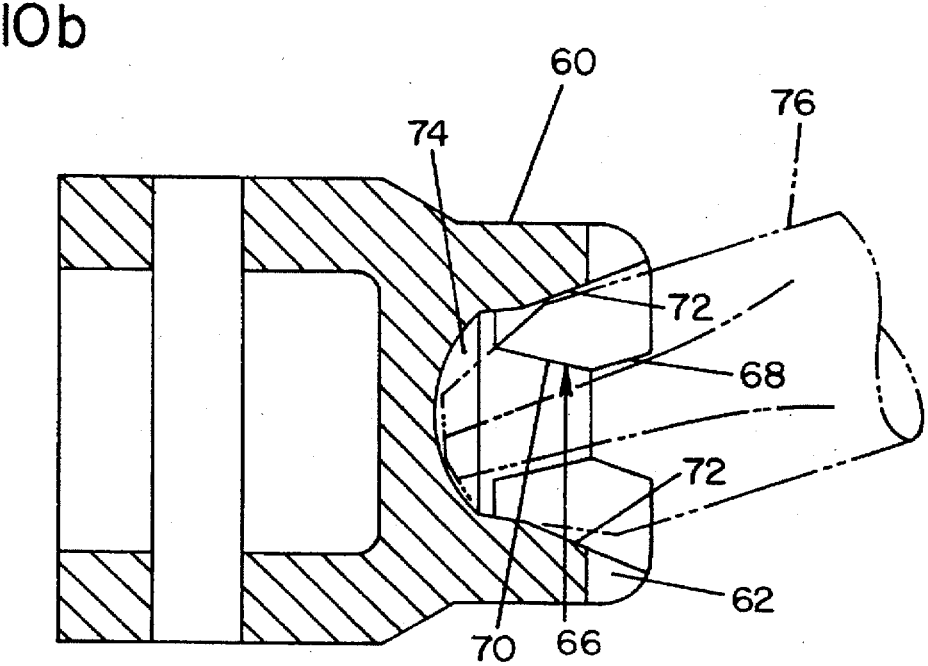
FIG. 10c

FRONT JAW FOR A SKI BINDING

FIELD OF THE INVENTION

The present invention relates generally to a front jaw or toe piece of a ski binding and a method for assembling said front jaw.

BACKGROUND OF THE INVENTION

European patent publication No. 0 311 832 1A discloses a ski binding toe piece or front jaw having a housing arranged on a base plate fixedly attached to the ski, and two sole holders, which are held in position by means of a two-part spring-loaded tension applying means. The spring has one end bearing against the housing and one end bearing against the head of a screw. The preloading effect of the spring acting on the two-part tension applying means being adjustable by turning the head of the screw. The screw head is arranged at the front end of the housing to be freely accessible from outside the housing. Accordingly, a screwdriver can be used to alter the loading effect of the spring, and thus set the release force of the ski binding front jaw. It is possible for a sleeve, mounted in the housing for sliding motion, to be shifted together with the screw head. The free end of the sleeve, which is inside the housing, cooperates with a scale on the housing to provide an indicating device for indicating the release force of the ski binding front jaw. However, the foregoing arrangement has the drawback that the scale indicating the release force setting of the ski binding front jaw has relatively poor resolution. Furthermore, the two-part tension applying means of the prior art ski binding front jaw is difficult to mount in the housing, which is otherwise kept closed. In this respect, the part of the tension applying means acting on the sole holders is not fixed prior to engagement with the threads of the screw part of the tension applying means. Accordingly, it is difficult to position the two parts of the tension applying means so that their respective threads cooperate.

One of the disadvantages of prior art setting spindles or setting screws (also referred to as "caps") having a cross-recessed head is that the torque to be transmitted onto the setting spindle via a screwdriver or the like, can only be optimally transmitted when the longitudinal axis of the screwdriver lies within the longitudinal axis of the setting spindle. When the screwdriver is coaxial with the setting spindle the flanks of the screwdriver head abut against the respective flanks of the cross-recessed head. During mounting or setting of the ski binding, however, situations often arise in which the screwdriver cannot be inserted in the optimum position, i.e., coaxial with the longitudinal axis of the setting spindle, as explained above. In this case only a portion of the screwdriver flanks and a portion of the flanks of the cross-recessed setting spindle head will rest against each other. Accordingly, the screwdriver may slip during transmission of high torque. In particular, the foregoing problem arises for setting spindles used for adjusting the release force value of a ski binding front jaw.

SUMMARY OF THE INVENTION

According to the present invention, there is provided a toe piece or front jaw comprised of a two-part tension applying means having a screw part in the form of a coupling screw, and a connecting part that is pivotally connected with sole holders. The coupling screw is coupled with a cap (or setting spindle or setting screw) that slips over the coupling screw. The front jaw also includes a two-part housing (i.e., a stationary housing part and a detachable housing part) to substantially simplify assembly of the front jaw. The cap is arranged in the detachable housing part and is rotatable from outside the detachable housing part. The coupling screw may be screwed into the connecting part of the tension applying means when the detachable housing part is removed from the stationary housing part (i.e., the housing is open). This screwing operation may be visually observed through an opening in the stationary housing part. A spring is arranged between the head of the coupling screw and the stationary housing part to provide a spring loading effect.

In accordance with a further embodiment of the present invention there is provided a ski binding front jaw having two sole holders that are connected together in a pivotal manner by means of an articulated bolt or pin, and a tension applying means. The tension applying means acts on the joint pin centrally and includes a coupling screw having a screw head in the form of a circular disk. The circular disk has a plurality of projections distributed about its periphery. The front jaw is also comprised of a setting spindle or cap having a funnel-shaped coupling part. Longitudinally extending grooves corresponding to the projections of the coupling screw are formed in the interior of the funnel-shaped coupling part.

In accordance with another preferred embodiment of the present invention there is provided a coupling screw comprised of a coupling part having a disk-shaped head with eight evenly distributed projections arranged on its periphery.

According to another aspect of the present invention there is provided an indicating device arranged in the detachable housing part, for indicating the release force setting of the ski binding front jaw. The indicating device is set in the detachable housing part and engages with the setting spindle or cap by threads. In this respect, a screw thread is provided along the outer surface of the cap at the open end thereof. This thread is in threaded engagement with a corresponding screw thread provided on the indicating device. The indicating device is movable within the detachable housing part upon rotation of the cap. By a suitable selection of the pitch angles for the threads it is possible to provide a convenient transmission ratio or mechanical advantage.

According to another aspect of the present invention there is provided a setting spindle or cap having a cross-recessed head comprised of slots. The slots form corner portions comprised of first corner edges that inwardly incline towards each other in a first region and second corner edges that incline away from each other in an oblique manner in a second adjacent region. A recess formed inside of the cross-recessed head undercuts the corner portions formed by the slots. Therefore, a screwdriver or the like adapted for engagement with a cross-recessed head can be inserted at an angle (i.e., inclined) with respect to the longitudinal axis of the setting spindle or cap. The slots may also each extend diagonally over the entire diameter of the cross-recessed head.

In accordance with a preferred embodiment of the present invention, walls in the area of the slots extend inwardly inclined towards each other within the cross-recessed head.

In accordance with another preferred embodiment of the present invention there is provided a setting spindle or cap that is mounted on the ski binding at an inclination angle of 10°–12° relative to the longitudinal axis of the ski binding base plate or ski.

According to another aspect of the present invention there is provided a method of assembling a front jaw of toe piece comprising the steps of mounting to a stationary housing part a sole holder connected with a tension-applying means having a coupling screw; arranging a spring between the stationary housing part and the head of the coupling screw; setting a rotatable setting spindle or cap to an appropriate position in a detachable housing part; and slipping the detachable housing part onto the stationary housing part such that the rotatable cap comes into engagement with the screw head of the coupling screw. Lastly, the detachable housing part is fixed or attached to the stationary housing part.

According to another aspect of the present invention, the method of assembling a front jaw or toe piece set forth above includes the step of setting the loading effect of the spring to a predetermined value by rotating the coupling screw of the tension applying means before the detachable housing part is fixed to the stationary housing part. Setting a slidingly mounted indicating device arranged in the detachable housing part to the value corresponding to the loading effect of the spring. Accordingly, after fixing the detachable housing part to the stationary housing part, the skier may be certain that the value shown on the indicating device corresponds to the release force value of the ski binding front jaw, as dictated by the loading effect of the spring.

It is an object of the present invention to provide a front jaw or toe piece that is simple to assemble.

It is an object of the present invention to provide a head for a setting spindle or cap that allows for good transmission of torque from a screwdriver or the like, when the screwdriver is inserted obliquely to the longitudinal axis of the setting spindle or cap.

It is another object of the present invention to provide a method of assembling a front jaw or toe piece that is quick and easy.

These and other objects will become apparent from the following description of a preferred embodiment of the invention taken together with the accompanying drawings and the appended claims.

BRIEF DESCRIPTION OF THE DRAWINGS

The invention may take physical form in certain parts and arrangement of parts, an embodiment of which is described in detail in the specification and illustrated in the accompanying drawings wherein:

FIG. 9a shows an end plan view of the head of the setting spindle of FIG. 5, looking in the direction of the arrow C;

FIG. 9b, shows a sectional view of the head of the setting spindle taken along line A—A of FIG. 9a;

FIG. 9c shows another sectional view of the head of the setting spindle taken along line B—B of FIG. 9a.

FIG. 10a shows an end plan view of a setting spindle head according to another embodiment of the present invention;

FIG. 10b shows a sectional view of the setting spindle head taken along line A—A of FIG. 10a; and FIG. 10c shows another sectional view of the setting spindle head taken along line B—B of FIG. 10a;

DETAILED DESCRIPTION OF THE PREFERRED EMBODIMENT

Figure 1:
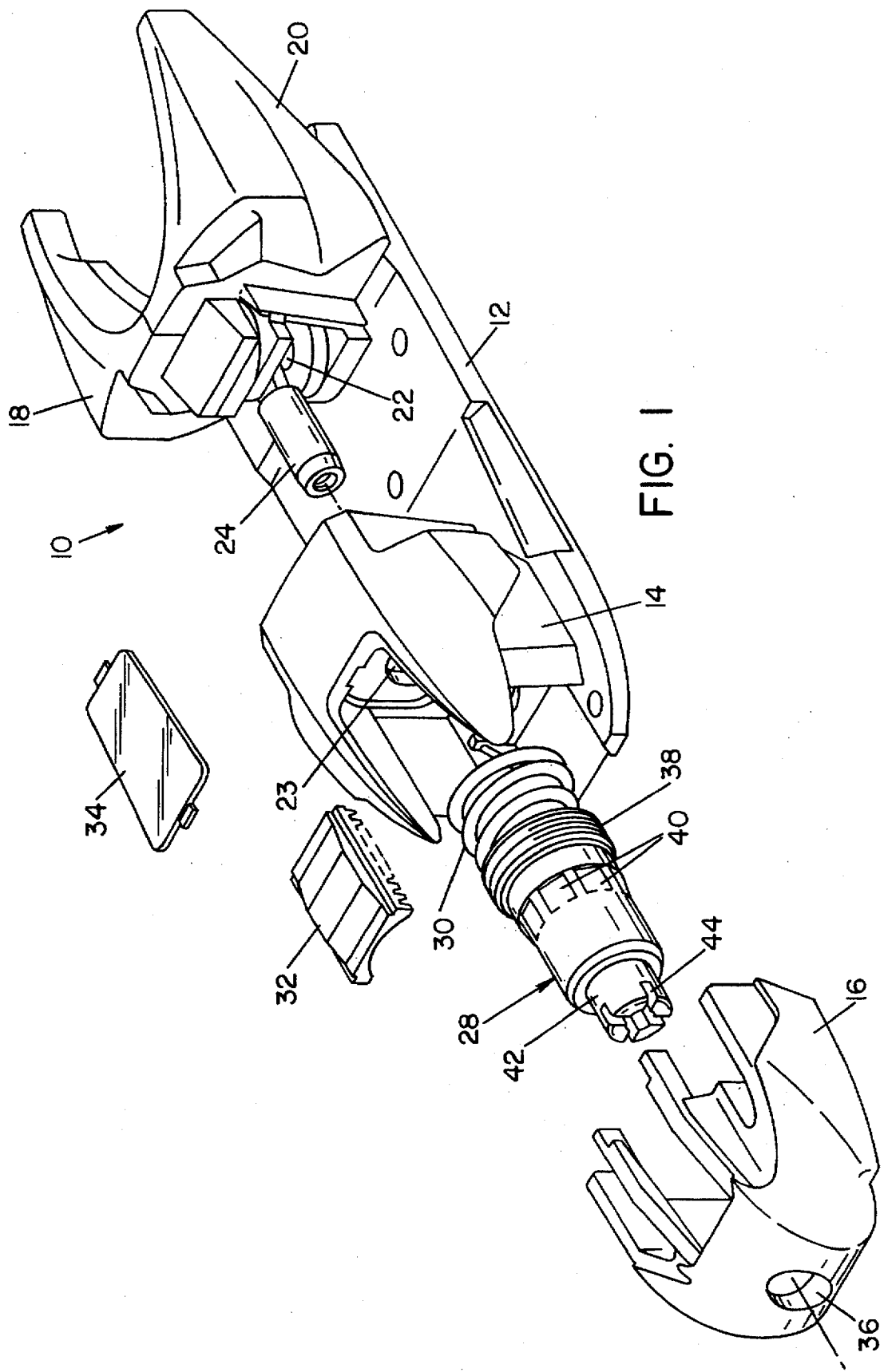
FIG. 1 shows an exploded perspective view of a front jaw in accordance with a preferred embodiment of the present invention.

Referring now to the drawings wherein the showing is for the purpose of illustrating a preferred embodiment of the invention only, and not for the purpose of limiting same, FIG. 1 shows toe piece or front jaw 10 comprised of a base plate 12, which is adapted to be screwed to a ski (not shown). A forward opening housing 14 is arranged at the front end of base plate 12 (i.e., the part of front jaw 10 nearer the front tip of the ski when front jaw 10 is in a mounted condition). It will be appreciated that base plate 12 and forward-opening housing 14 may be manufactured in the form of an injection molding. A detachable housing part 16 attaches to the forward end of housing 14. Removal of detachable housing part 16 allows the interior of housing 14 to be accessed.

Figure 2:
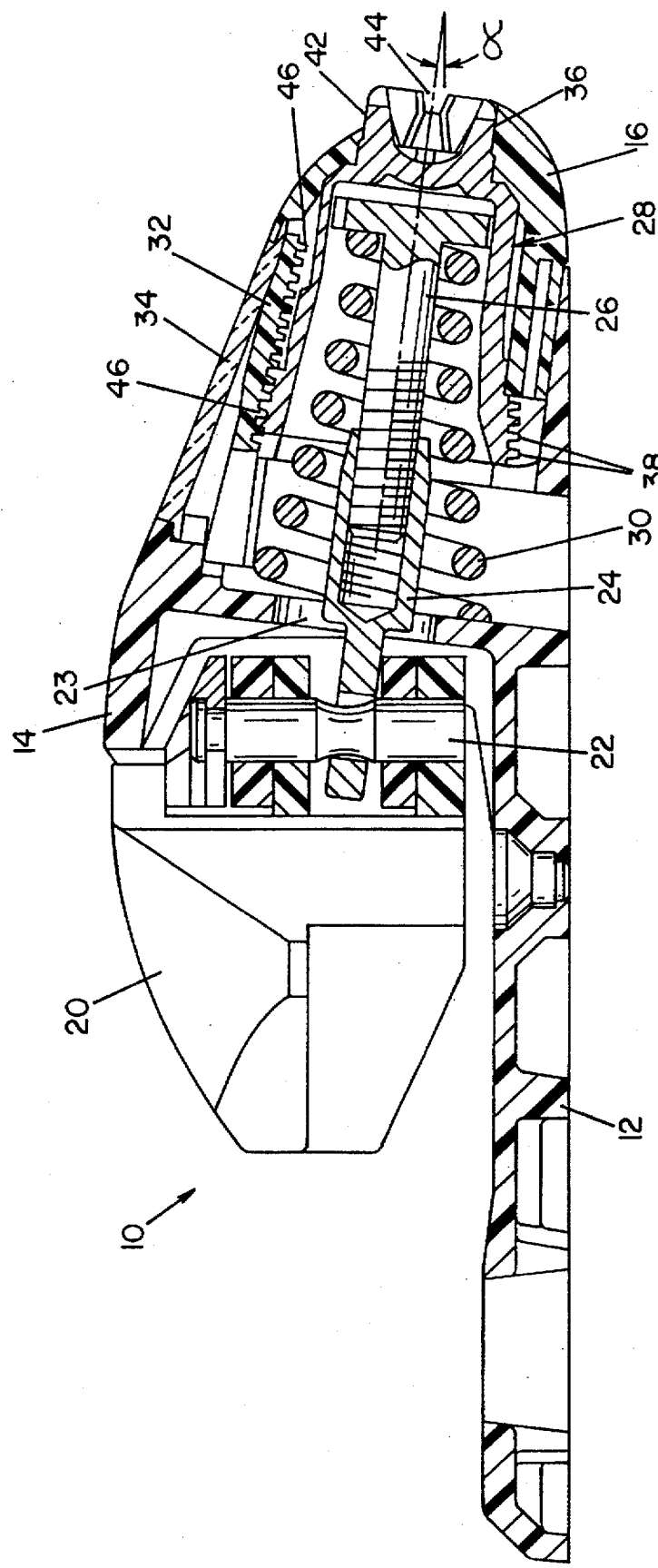
FIG. 2 shows a sectional view taken through the embodiment of the front jaw shown in FIG. 1.
Figure 3:
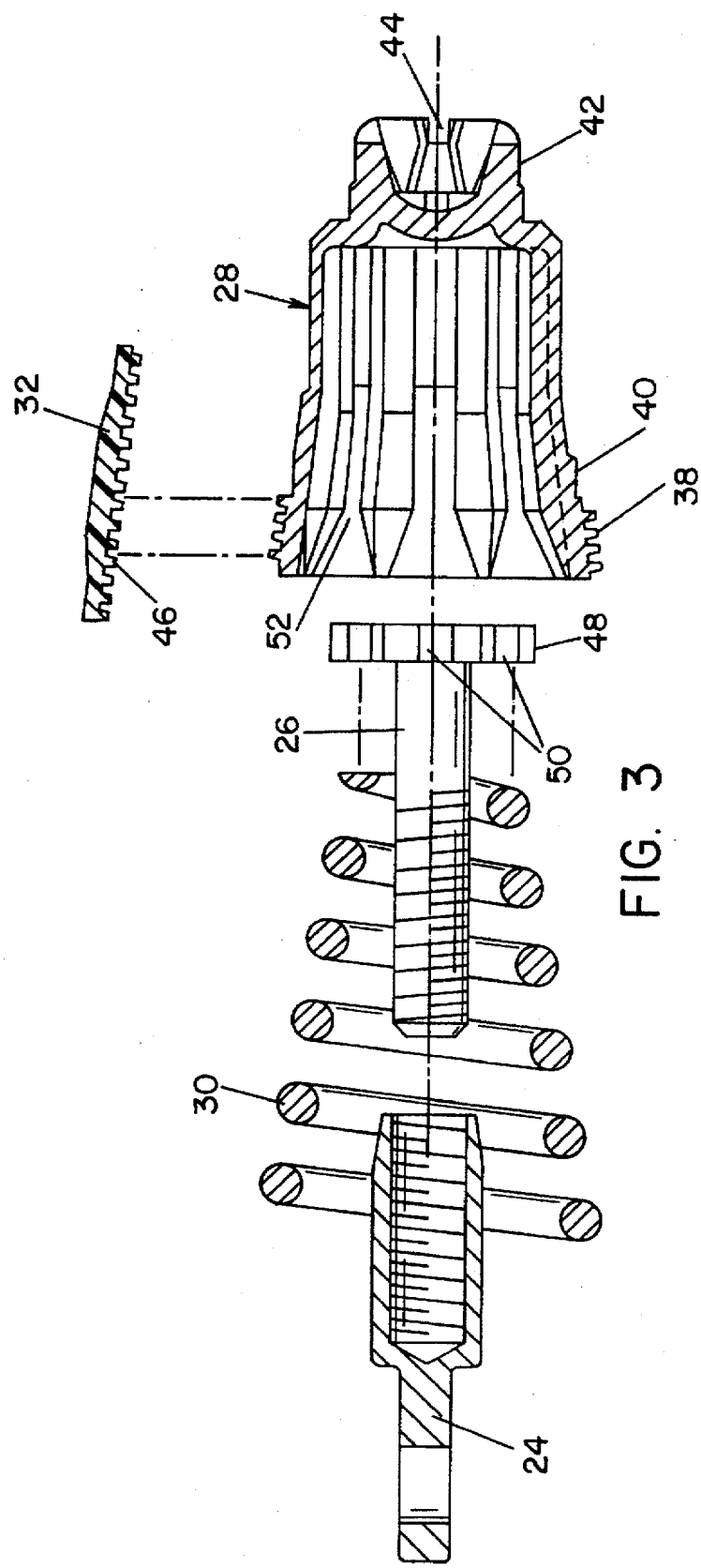
FIG. 3 shows an exploded sectional view of a part of the front jaw shown in FIG. 1.

Referring to FIGS. 2 and 3, a two-part tension applying means 24 is comprised of a connecting part and a screw part. A bolt or joint pin 22 joins sole holders 18 and 20 to the connecting part of tension applying means 24. Sole holder 18 and 20 are respectively held on joint pin 22 so that they are pivotable relative to one another. Tension-applying means 24 acts on joint pin 22 centrally. The connecting part extends in a forward direction through an opening 23 in the rear wall of housing 14. The forwardly directed section of the connecting part is in the form of a screw threaded bushing. The screw part of tension applying means 24 takes the form of a coupling screw 26. Coupling screw 26 screws into the screw threaded bushing of the connecting part. A funnel-shaped spring 30 is loaded by screwing together the connecting part and screw part of tension applying means 24. In this respect, spring 30 bears against the screw head of coupling screw 26 and against the rear wall of housing 14. The release force setting of sole holders 18 and 20 is modified by varying the loading effect of spring 30. Preferably, the connecting part and screw part of tension applying means 24 are screwed together before detachable housing part 16 is attached to housing 14. This allows the screwing operation to be visually observed through the forward opening in housing 14. The wall of housing 14 directed towards the rear end of the ski (when front jaw 10 is in a mounted condition) is engageable with sole holders 18 and 20. It should be appreciated that after the connecting part and screw part of tension applying means 24 are screwed together, tension applying means 24 will be so rigid that detachable housing part 16 can be readily attached to housing 14 and firmly connected therewith.

Front jaw 10 is also comprised of a radially symmetric cap or setting spindle 28 having a funnel-shaped coupling part dimensioned to receive coupling screw 26. Setting spindle 28 also has a cross-recessed head 42 at one end thereof. Head 42 has a relatively small diameter so that it can be inserted through a forward-directed opening 36 in detachable housing part 16 when housing part 16 is removed from housing 14. Accordingly, head 42 is accessible from outside detachable housing part 16 for rotation of setting spindle 28. Setting spindle 28 is in threaded engagement with a tabular or plate-like indicating device 32 that indicates the release force value set for ski binding front jaw 10. In this respect, a screw thread 38 is formed along the outer surface of setting spindle 28 at the open end of the funnel-shaped coupling part. A cooperating screw thread 46 is formed along a surface of indicating device 32. Indicating device 32 is mounted in a sliding fashion in a guide means formed on detachable housing 16, and shifts axially with respect to the longitudinal direction of front jaw 10, as setting spindle 28 is rotated. In accordance with the pitch of the screw threads 38 and 46, it is possible for any desired transmission ratio to be set for the axial movement of indicating device 32. Therefore, a satisfactory scale resolution for indicating device 32 is provided. A window 34 allows one to read the release force value of indicating device 32 on a stationary scale. The funnel-shaped coupling part of setting spindle 28 slips over and engages with coupling screw 26 when detachable housing part 16 is attached to housing 14. Accordingly, rotation of head 42 of setting spindle 28 will rotate coupling screw 26, and thus adjust the loading effect of spring 30.

Figure 4:
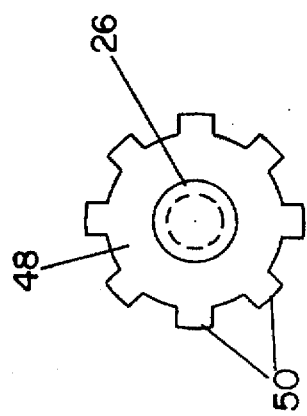
FIG. 4 shows an end plan view of the coupling screw in accordance with the embodiment shown in FIG. 3.
Figure 6:
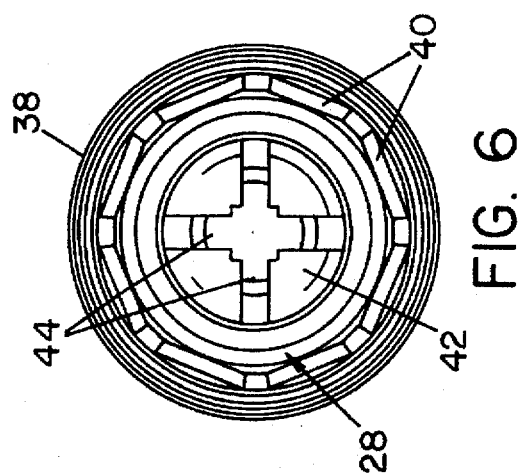
FIG. 6 shows an end plan view of the setting spindle of FIG. 5, looking in the direction of the arrow C.

Referring now to FIGS. 4–8, setting spindle 28 and coupling screw 26 of tension applying means 24 are described in greater detail. Coupling screw 26 has a screw head 48 in the form of a circular disk, as shown in FIG. 4. Eight evenly spaced projections 50 are provided on the periphery of the circular disk. Projections 50 fit into corresponding grooves 52 formed along the interior surface of the funnel-shaped coupling part of setting spindle 28 (see FIG. 3). It is advantageous to provide a large number of projections so that during assembly of front jaw 10, setting spindle 28 only has to be turned through a comparatively small angle if projections 50 do not immediately fit into corresponding grooves 52 when arranging setting spindle 28 on disk-shaped screw head 48 of coupling screw 26. In order to facilitate the insertion and guidance of coupling screw projections 50 into the interior of setting spindle 28, grooves 52 are widened out like a funnel adjacent to the open end of the funnel-shaped coupling part of setting spindle 28. It will be appreciated that projections 50 and grooves 52 may also take the form of polygons.

FIGS. 5–8 show setting spindle 28 according to a preferred embodiment. Head 42 of setting spindle 28 includes cross-recessed slots 44 for engagement with a torque providing means, such as a screwdriver, POZIDRIV®, or the like.

The outer surface of the funnel-shaped coupling part of setting spindle 28 has flat surface portions 40 located adjacent to screw thread 38. Flat surface portions 40 engage with corresponding partly elastic or resilient lugs arranged in the interior of detachable housing part 16, when setting spindle 28 is inserted into detachable housing part 16. Accordingly, rotation of setting spindle 28 is only possible after overcoming the force of the opposing lugs. This prevents undesired rotation of setting spindle 28, in particular, during assembly of front jaw 10. Thus, indicating device 36 is prevented from being accidently misadjusted during assembly of front jaw 10. It will be appreciated that indicating device 36 can be adjusted to indicate the release force provided by the loading effect of spring 30, before detachable housing part 16 (with setting spindle 22 and indicating device 36 arranged therein) is attached to housing 14.

Figure 5:
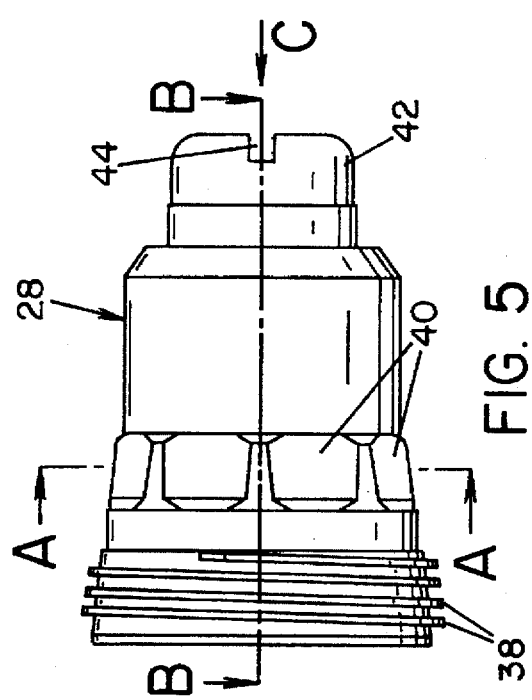
FIG. 5 shows a side plan view of the setting spindle shown in FIG. 3.
Figure 8:
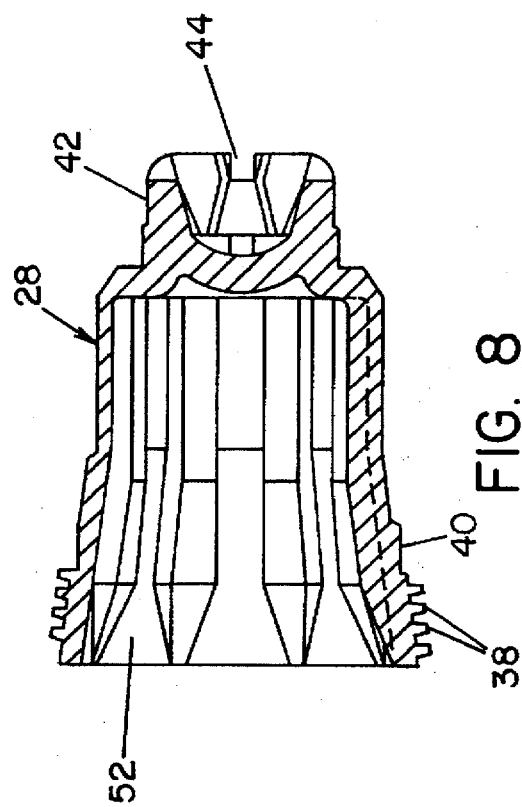
FIG. 8 shows a sectional view of the setting spindle along line B—B of FIG. 5.
Figure 7:
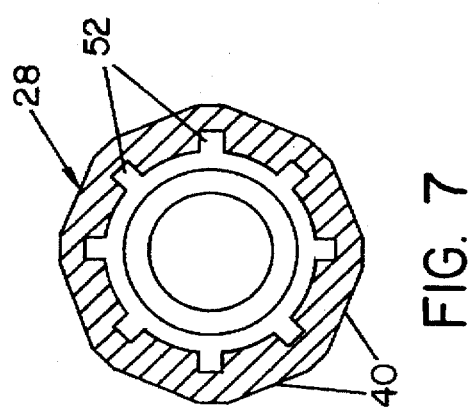
FIG. 7 shows a sectional view of the setting spindle taken along line A—A of FIG. 5.

Referring now to FIG. 9a, there is shown an end plan view of cross-recessed head 42 of setting spindle 28 looking in the direction of arrow C of FIG. 5. Accordingly, a plan view of head 42 is shown. Cross-recessed head 42 is comprised of slots 62 and 64 crossing each other. Slots 62 and 64 each extend over the entire width or diameter of head 42 and form corner portions 80 and standing-back corner portions 78. Slots 62 and 64 are dimensioned to receive a screwdriver, a modified screwdriver commonly known as a POZIDRIV®, or other torque providing means. It should be appreciated that standing-back corner portions 78 are provided to accommodate a POZIDRIV® screw head.

Referring now to FIGS. 9b and 9c, slots 62 and 64 form corner portions 80 comprised of corner edges 68 and 70. Corner edges 68 extend from the outer end of head 42 in an inwardly inclination towards each other (i.e., towards the central axis of head 42) as corners edge 68 extend inward. Corner edges 70 extend obliquely away from each other (i.e., away from the central axis of head 42) as corner edges 70 extend inward. Along the inside of head 42 a recess 74 follows corner portions 80. Recess 74 undercuts corner portions 80 and standing-back corner portions 78. Head 42 also includes inwardly inclined walls 72, shown with dashes in FIG. 9a. Walls 72 are inclined towards each other (i.e., towards the central axis of head 60) as walls 72 extend inward (see FIG. 9c).

Referring now to FIGS. 10a–10c there is shown a detailed illustration of another embodiment of a cross-recessed head of a setting spindle. Cross-recessed setting spindle head 60 is comprised of slots 62 and 64 crossing each other. Slots 62 and 64 each extend over the entire width or diameter of head 60, as shown in FIG. 10a. Slots 62 and 64 form corner portions 66 comprised of corner edges 68 and 70. FIG. 10b shows the form of the contours of corners edges 68 and 70. Corner edges 68 extend from the outer end of head 60 in an inwardly inclination towards each other (i.e., towards the central axis of head 60) as corner edges 68 extend inward. Corner edges 70 extend obliquely away from each other (i.e., away from the central axis of head 60) as corner edges 70 extend inward. In FIG. 10c, corner portions 66 are shown with corner edges 68 and 70. Head 60 also includes inwardly inclined walls 72, shown with dashes in FIG. 10a. Walls 72 are inclined towards each other (i.e., towards the central axis of head 60) as walls 72 extend inward. Along the inside of head 60 a recess 74 follows corner portions 66. Recess 74 undercuts corner portions 66. FIG. 10c also illustrates the manner in which the tip of a screwdriver 76 engages cross-recessed head 60. In this respect, screwdriver 76 is inclined relative to the line of symmetry (i.e., longitudinal axis) of cross-recessed head 60. Due to the geometric design of slots 62 and 64 screwdriver 76 can be inserted at an inclined position without reducing the contact surface at the side flanks of the cross-recessed head. Accordingly, large amounts of torque can be transmitted from screwdriver 76 to head 60.

FIG. 2 illustrates a preferred use of the setting spindle head 42 according to a preferred embodiment of the present invention. Front jaw 10 of a ski binding is shown in which setting spindle 28 (including head 42) is inclined by an angle α relative to the horizontal line (i.e., the longitudinal axis) of the base plate of front jaw 10. The angle is generally between 6°–12°, but is preferably 8°. To change the release force of the ski binding front jaw 10 a screwdriver, POZIDRIV® or other torque-providing means, is inserted parallel to the base plate of front jaw 10. Due to the design of setting spindle head 42 according to a preferred embodiment of the present invention, torque can easily be transmitted from the screwdriver to head 42 of setting spindle 28. Despite the inclination of setting spindle 28 a sufficient contact surface is provided between the screwdriver and the cross-recessed head 42 of setting spindle 28. It will be appreciated that the cross-recessed setting spindle head 60 shown in FIGS. 10a–10c can be used to obtain the same results.

The above-described structure of front jaw 10 facilitates the fitting and mounting thereof.

A preferred method for assembling front jaw 10 is as follows:

(1) mounting sole holders 18 and 20 to tension-applying means 24;

(2) arranging spring 30 between the rear wall of housing 14 and the screw head of coupling screw 26;

(3) arranging setting spindle 28 within detachable housing part 16;

(4) attaching detachable housing part 16 to housing 14, such that setting spindle 28 engages with the screw head of coupling screw 26.

The loading effect of spring 30 is preferably set to a predetermined value before detachable housing part 16 is attached to housing 14. The loading effect of spring 30 is adjusted by rotating coupling screw 26. Furthermore, it is preferable to arrange and set indicating device 32 in detachable housing part 16, before detachable housing part 16 is attached to housing 14. Indicating device 32 is set to a value corresponding to the loading effect of spring 30. Therefore, the skier can be certain that the value indicated by indicating device 32 accurately corresponds to the release force value of ski binding front jaw 10, as dictated by the loading effect of spring 30.

The foregoing description is a specific embodiment of the present invention. It should be appreciated that this embodiment is described for purposes of illustration only and that numerous alternations and modifications may be practiced by those skilled in the art without departing from the spirit and scope of the invention. It is intended that all such modifications and alterations be included insofar as they come within the scope of the invention as claimed or the equivalents thereof.

The invention claimed is:

1. A front jaw for a ski binding, the front jaw comprising:

a housing means arranged on a base plate means mountable to a ski, said housing means having a detachable housing portion;

at least one sole holder means located within the housing means for holding the sole of a ski boot;

an adjustable tension applying means comprised of:

a connecting portion attachable to the at least one sole holder means;

a coupling screw having a screw head and connectable to the connecting portion; and spring means for loading said tension applying means, the loading effect of the spring means being adjustable by rotation of the coupling screw; and cap means for receiving the screw head of the coupling screw, said cap means having inner surface portions which lockingly engage with the screw head when received therein, said detachable housing portion being dimensioned to receive the cap means, wherein the cap means engages with the screw head to effect rotation of the coupling screw, said cap means having a tool receiving portion extending outside the detachable housing portion for rotation by a tool to effect rotation of the coupling screw.

2. A front jaw as defined in claim 1, wherein said front jaw further comprises:

a joint pin means for pivotally connecting two sole holder means together, said joint pin means engaging with the connecting portion of said tension applying means.

3. A front jaw as defined in claim 2, wherein said coupling screw includes a screw head in the form of a circular disk having a plurality of peripheral projections, and wherein said cap means includes a funnel-like coupling part having longitudinally-extending grooves corresponding to the peripheral projections of the circular disk.

4. A front jaw as defined in claim 3, wherein said circular disk has eight evenly spaced peripheral projections.

5. A front jaw as defined in claim 1, wherein said front jaw further comprises:

an indicating means for indicating a release force adjustment of the front jaw, said indicating means mountable in a sliding manner in said detachable housing portion.

6. A front jaw as defined in claim 5, wherein said indicating means is operatively engageable with said cap means arranged in said detachable housing portion.

7. A front jaw as defined in claim 6, wherein said indicating means has a screw thread and a first portion of the outer surface of said first cap means has a screw thread, said screw thread of the indicating means engageable with the screw thread of said cap means.

8. A front jaw as defined in claim 1, wherein a first portion of the outer surface of said cap means has peripheral flat surface portions, and said detachable housing portion having at least partly elastic lugs arranged in the interior thereof, said peripheral flat surface portions engageable with said elastic lugs.

* * * * *